United States Patent [19]

Gay et al.

[11] Patent Number: 4,802,086
[45] Date of Patent: Jan. 31, 1989

[54] FINUFO CACHE REPLACEMENT METHOD AND APPARATUS

[75] Inventors: James G. Gay, Pflugerville; Jesse R. Wilson, Austin; William C. Moyer, Dripping Springs; Terry V. Hulett, San Antonio, all of Tex.

[73] Assignee: Motorola, Inc., Schaumburg, Ill.

[21] Appl. No.: 2,335

[22] Filed: Jan. 9, 1987

[51] Int. Cl.$^4$ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,168,541 | 9/1979 | Dekarske | 364/200 |
| 4,277,826 | 7/1981 | Colline et al. | 364/200 |
| 4,314,331 | 2/1982 | Porter et al. | 364/200 |
| 4,523,206 | 6/1985 | Sasscer | 364/200 |
| 4,530,054 | 7/1985 | Hamstra et al. | 364/200 |
| 4,586,133 | 4/1986 | Steckler | 364/200 |
| 4,747,043 | 5/1988 | Rodman | 364/200 |

Primary Examiner—David Y. Eng
Attorney, Agent, or Firm—Jeffrey Van Myers

[57] ABSTRACT

A cache location selector selects locations in a cache for loading new information using either a valid chain, if not all locations already contain valid information, or a history loop otherwise. The valid chain selects the "highest" location in the cache which does not already contain valid information. The history loop selects locations in accordance with a modified form of the First-In-Not-Used-First-Out (FINUFO) replacement scheme. Both the valid chain and the history loop are fully and efficiently implemented in hardware. During normal cache operation, both the valid chain and the history loop continuously seek an appropriate location to be used for the next load. As a result, that location is preselected well before the load is actually required.

14 Claims, 4 Drawing Sheets

FINUFO CACHE REPLACEMENT METHOD AND APPARATUS

FIELD OF THE INVENTION

The subject invention relates generally to cache management and, more particularly, to a First-In-Not-Used-First-Out (FINUFO) replacement algorithm for use in a cache manager.

BACKGROUND ART

In high performance data processing systems, high speed data and/or instruction caches are often provided to minimize delays between the processor and the memory system. Whenever an operand, either data or instruction, is accessed by the processor which is not resident in the respective cache, the cache manager will allow the memory system to provide the operand to the processor. In parallel, the cache manager will select a location in the cache into which the operand will be loaded when provided by the memory system. Subsequent accesses to the same operand can then be serviced by the cache without resorting to the memory system. After valid operands have been loaded into all of the available locations in the cache, any subsequent operand load requires the replacement of one of the other valid operands already resident in the cache. Various algorithms have been devised to select which of the "old" operands should be replaced by the "new" operand. In general, if hardware complexity is not a limiting factor, a true Least Recently Used (LRU) replacement algorithm, in which the location which was accessed by the processor the "least recently" is selected for replacement, is most efficient and therefore preferred. For example, true LRU replacement mechanisms were implemented in the IBM System/360 Model 68 and the CDC STAR-100.

On the other hand, if no hardware can be dedicated to this function, any of a number of replacement algorithms can be implemented in software, but only with a significant degradation of execution speed. One such scheme, referred to as "First-In-First-Out" (FIFO) replacement, maintains a pointer to each cache location in a "queue". When a given location is used, that is either loaded or accessed, the pointer to that location is moved to the tail of the queue. When a location is needed to load a new operand, the location indicated by the pointer at the head of the queue is selected. Unfortunately, in some circumstances, FIFO replacement can result in excessive replacement of frequently used operands.

A variation of FIFO, "First-In-Not-Used-First-Out" (FINUFO) replacement, associates with each location in the cache a "history" or "use" bit. Unlike FIFO, FINUFO assembles the pointers in a circular "loop" and maintains an "index" as an entry point into the loop. When a given location is used, the associated history bit is "set". Then, when a location is needed for loading a new operand, the history bit associated with the location indicated by the pointer at the index is examined. If the history bit is set, it is immediately "cleared". The index is then advanced to the next pointer in the loop, and the history bit associated with the respective location is then checked. This elimination process continues until the first location having a clear history bit is found and selected for loading. If all locations have the associated history bits set when the elimination process begins, the progressive clearing of the history bits assures that a location WILL be selected after the index has been advanced once around the full loop. However, a given location will rarely be selected for reuse as long as it is used at least once between each operand load. The FINUFO replacement algorithm was implemented, largely in software but with the history bits in hardware, in the MULTICS system for the GE 635/645 system, and in both the University of Michigan Multi-Programming Supervisor (MPS) and the original version of the CP-67 operating system for the IBM System/360 Model 67.

One disadvantage of the FINUFO algorithm is the reliance on software for loop management, severely restricting performance. Performance is further reduced since FINUFO cannot even begin to search for a location until a load is actually pending—otherwise, the status of the history bit(s) of the most recently used locations may not be correct.

SUMMARY OF THE INVENTION

Accordingly, it is an object of the present invention to provide an improved FINUFO replacement mechanism capable of preselecting the next location to be loaded.

Another object of the present invention is to provide a FINUFO replacement mechanism wherein the history bits are continuously scanned to preselect the next location to be loaded.

Yet another object of the present invention is to provide an efficient implementation in hardware of the FINUFO replacement mechanism.

Still another object of the present invention is to provide a particularly efficient implementation in hardware of a valid chain and a history loop for use in a FINUFO replacement mechanism.

These and other objects are achieved in a cache having an ordered plurality of locations into a selected one of which information is loaded in response to a select signal applied thereto. In the preferred form, each location selector comprises: an ordered plurality of valid bit latches, each associated with a respective one of the locations in the cache, for storing valid bits indicative of the validity of the information in the associated location in the cache; valid select logic, coupled to the valid bit latches, for determining the highest one, if any, of the valid bit latches having a valid bit indicating the invalidity of the information in the associated location in the cache, and providing a first location selection signal corresponding to that location in the cache; a location index latch, responsive to the select signal, for providing an index signal indicative of an indexed location in the cache relative to the location indicated by the select signal; an ordered plurality of history bit latches, each associated with a respective one of the locations in the cache, for storing history bits indicative of the replacement status of the information in the associated location in the cache; replacement select logic, coupled to the history bit latches, for determining the highest one, if any, of the history bit latches having a history bit indicating that the information in the associated location in the cache is replaceable, and providing a second location selection signal corresponding to that location in the cache; and location select logic, coupled to the valid bit latches, for applying the select signal to the location in the cache selected by the first location selection signal if at least one of the valid bits indicate that the information in the associated location in the cache is invalid, and applying the select signal to the location in the cache selected by the second location selection signal if all of the valid bits indicate that the information in the associated locations in the cache are valid. In accordance with the present invention, the location selector includes history bit control logic, coupled to the history bit latches and to the location index latch, for storing into each of the history bit latches associated with all locations in the cache lower than the indexed location but higher than the selected location, an indication that the information in the associated location in the cache is replaceable.

DESCRIPTION OF THE INVENTION

Figure 1:
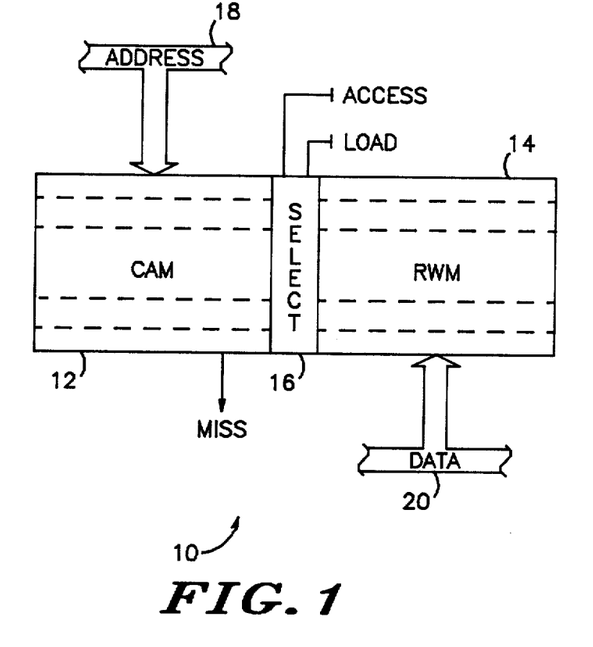
FIG. 1 illustrates in block diagram form, a cache having location select logic constructed in accordance with the present invention.

Shown in FIG. 1 is a cache 10 comprising a content addressable memory (CAM) 12, a read/write memory (RWM) 14, and location select logic 16. In general, each location in the RWM 14 corresponds to a respective location in the CAM 12. In response to a LOAD signal, the select logic 16 provides an enable signal to a selected location in the CAM 12 and the corresponding location in the RWM 14. In response to this enable signal, the selected location in the CAM 12, say location [4] of eight possible locations [7-0], latches the address then present on an address bus 18. Simultaneously, the corresponding location in the RWM 14, namely location [4], latches the data on a data bus 20. As a result, the data latched into location [4] of the RWM 14 is "associated" with the address latched into location [4] of the CAM 12. Typically, to distinguish those locations in the CAM 12 which contain "valid" addresses, the select logic 16 will set a Valid (V) bit associated with that location within the select logic 16.

In response to an ACCESS signal, the select logic 16 will simultaneously enable all of the locations of the CAM 12 which have the associated V bits set, to compare the address stored therein against the address then on the address bus 18. If a match is detected, the compare logic (not shown) of the location in the CAM 12 which detected the match will enable the corresponding location in the RWM 14, via the select logic 16, to output the data stored therein on the data bus 20. Thus, in response to a given address on the address bus 18, the associated data is provided on the data bus 20, just as in a conventional memory. However, the cache 10, being generally much smaller than the memory, can be made to respond significantly faster than that memory. In addition, the cache 10 can be tightly coupled to the host so that the utilization by that host of the communication bus between the host and the memory can be significantly reduced.

During normal operation, the host may decide for any number of reasons to discard or render "invalid" the address/data in one or more of the locations in the cache 10. In response to an appropriate command (not shown), the select logic 16 will reset or clear the V bit associated with that location. This location then joins the "pool" of available locations for selection by the select logic 16 for the next load. However, once this "pool" is depleted, the select logic 16 must itself decide which of the locations in the cache 10 to "reuse" in order to accommodate a new address/data. The subject invention relates to an improved mechanism for managing the pool of available locations, and to an improved form of the FINUFO replacement mechanism for selecting locations for reuse. In the preferred form, these mechanisms are allowed to operate continuously to, in effect, preselect the next location to be used.

Figure 2:
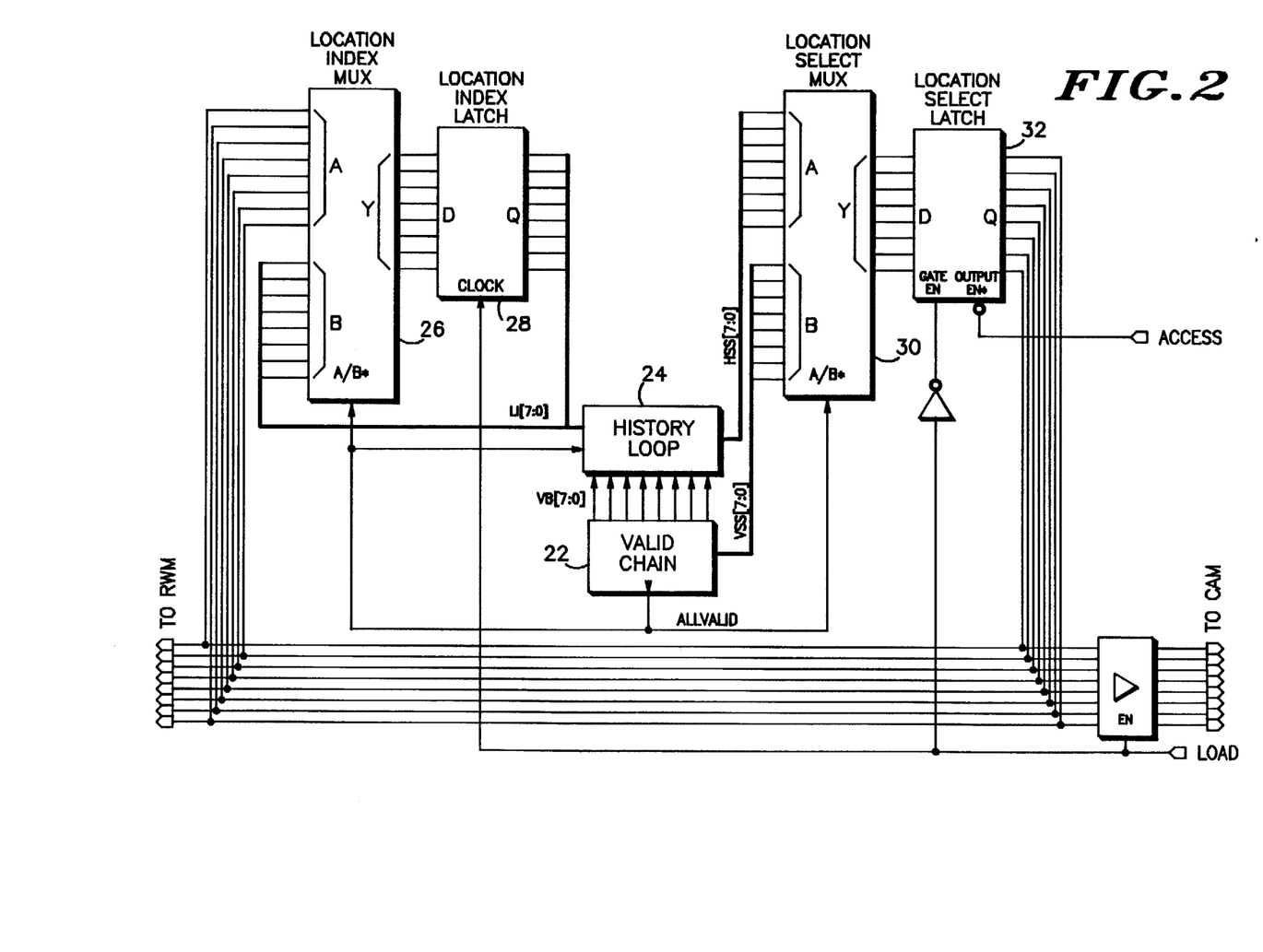
FIG. 2 illustrates in block diagram form, a preferred embodiment of the location select logic of the cache of FIG. 1.

Shown in FIG. 2 is a preferred form of the select logic 16. In general, the illustrated circuit continuously preselects a location in the cache 10 for use, using an appropriate one of two placement schemes, valid chain and history loop.

Initially, a sequential placement mechanism is used to fill the cache 10 in serial order until all locations in the cache 10 contain valid address/data. Once the cache 10 is completely "filled", an improved FINUFO replacement mechanism selects a location in the cache 10 for reuse. In the preferred form, each of these selection processes runs independently and continuously so that by the time a new address/data must be loaded, an appropriate location in the cache 10 has already been preselected.

In general, the location select logic 16 comprises a valid chain 22 (see FIG. 3) which performs the sequential placement function, a history loop 24 (see FIG. 4) and an associated location index multiplexor 26 and latch 28 which perform the FINUFO replacement function, and a location select multiplexer 30 and latch 32 which enables the location to be selected by either the valid chain 22 or the history loop 24, as appropriate.

Before all of the locations in the cache 10 are loaded with valid address/data, the valid chain 22 negates an ALLVALID signal to force the location select multiplexer 30 to allow the valid chain 22 to select the next location for use. When all of the locations in the cache 10 have been loaded, the valid chain 22 asserts ALLVALID to enable the location select multiplexer 30 to allow the history loop 24 to select the next location for use. As soon as the valid bit of any location has been cleared, the valid chain 22 will again negate ALLVALID and reassume control of the location select multiplexor 30, until every location in the cache 10 again contains valid address/data.

When a LOAD is actually received, the location select latch 32 is enabled to latch the current output of the location select multiplexor 30 for output to the CAM 12 and RWM 14. By latching the current location select information only when a new location is being loaded, the valid chain 22 and the history loop 24 can be allowed to continuously operate so that the select logic 16 will have selected a location well in advance of the next load operation, without starting and stopping either the chain or loop. In other words, by the time a replacement location is needed, select logic 16 has already identified that location.

Figure 3:
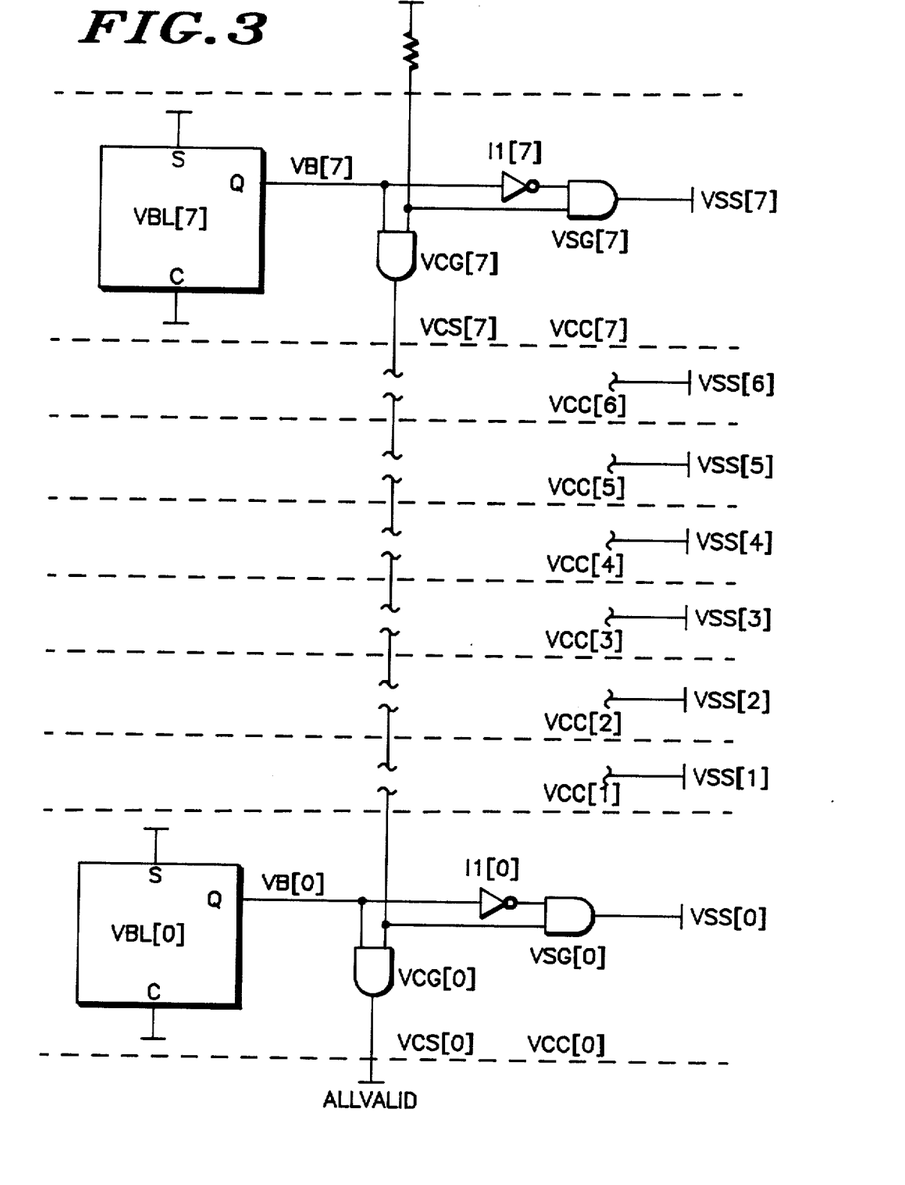
FIG. 3 illustrates a preferred embodiment of the valid chain in the location select logic of FIG. 2.

In the preferred embodiment of the valid chain 22 shown in FIG. 3, each location in the cache 10, say [0] through [7], has an associated valid chain cell, VCC[0] through VCC[7], respectively. For convenience of reference, the set of valid chain cells, VCC[7-0], are ordered with VCC[7] being the "highest" and VCC[0] the "lowest".

In the illustrated form, each VCC[x] includes a valid bit latch VBL[x], a two-input valid chain gate VCG[x] and a two-input valid select gate VSG[x]. In general, one input of each valid chain gate VCG[x] is connected to the output of the valid bit latch VBL[x] of the same cell and the other input thereof is connected to the output of the valid chain gate VCG[x+1] of the next higher valid chain cell VCC[x+1]. Similarly, one input of each valid select gate VSG[x] is connected to the output of the valid bit latch VBL[x] of the same cell via an inverter I1[x], and the other input thereof is connected to the output of the valid chain gate VCG[x+1] of the next higher valid chain cell VCC[x+1]. However, in the highest valid chain cell VCC[7], the valid chain signal VCS inputs of the valid chain gate VCG[7] and the valid select gate VSG[7] are connected so as to be asserted always.

In operation, a given valid chain cell, say VCC[4], will assert its valid select signal VSS[4] only if (1) its valid bit latch VBL[4] is CLEAR, indicating that the corresponding location in the cache 10 does not contain valid address/data, and (2) the next higher valid chain cell, namely VCC[5], is asserting its valid chain signal VCS[5], indicating that no valid chain cell higher in the valid chain 22, that is VCC[7-5], is asserting its valid select signal VSS[7-5], respectively. Simultaneously, that valid chain cell, namely VCC[4], will negate its valid chain signal VCS[4] to prevent all lower valid chain cells VCC[3-0] from asserting their valid select signals VSS[3-0], respectively. Since the valid chain signal VCS[7] input to the highest valid chain cell VCC[7] is always asserted, that cell will assert its valid select signal VSS[7] whenever its valid bit latch VBL[7] is CLEAR. However, if all of the valid bit latches VBL[7-0] are SET, the valid chain signals VCS[7-0] will propagate through all of the valid chain cells VCC[7-0], emerging as the ALLVALID signal at the output of the valid chain gate VCG[0] of the lowest valid chain cell VCC[0]. Thus, according to this arrangement, only one valid chain cell VCC[i] will assert its corresponding valid select signal VSS[i], and ALLVALID will be asserted only if no valid select signal VSS[7-0] is asserted.

Figure 4:
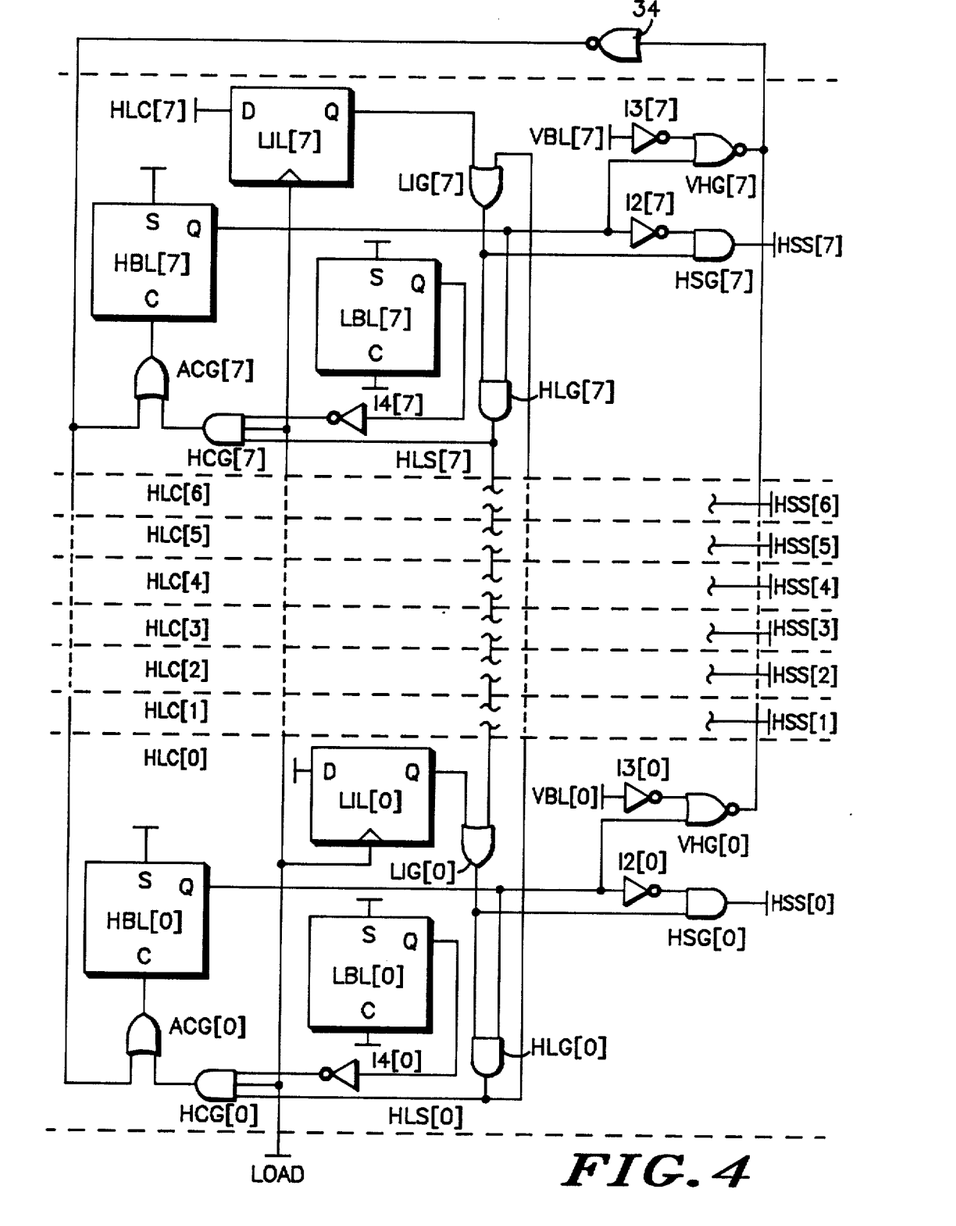
FIG. 4 illustrates a preferred embodiment of the history loop in the location select logic of FIG. 2.

In the preferred embodiment of the history loop 24 shown in FIG. 4, each location in the cache 10 (again assume [0] through [7]) has an associated history loop cell HLC[0] through HLC[7], respectively. For convenience of reference, the set of history loop cells, HLC[7-0], are arranged into an endless "loop", with "forward movement" along the loop relative to a given history loop cell HLC[x] being toward a "lower" history loop cell, namely HLC[x-1]. Similarly, "backward movement" is toward a "higher" HLC[x+1]. Since the history loop 24 is a full loop, the "lowest" history loop cell, that is HLC[0], is necessarily higher in the loop than the "highest" history loop cell, namely HLC[7] in this example. In the same sense, the "highest" history loop cell, i.e. HLC[7], is necessarily lower than the "lowest" history loop cell, HLC[0]. An "index" is continuously updated to indicate the current position in the loop.

In the illustrated form, each history loop cell HLC[x] includes a history bit latch HBL[x], a location index latch LIL[x], a two-input location index gate LIG[x], a two-input history loop gate HLG[x] and a two-input history select gate HSG[x]. In general, one input of the location index gate LIG[x] of each history loop cell HLC[x] is connected to the output of the location index latch LIL[x] of the same cell and the other input thereof is connected to the output of the history loop gate HLG[x+1] of the next higher history loop cell HLC[x+1]. One input of each history loop gate HLG[x] is connected to the output of the history bit latch HBL[x] of the same cell and the other input thereof is connected to the output of the location index gate LIG[x] of the same cell. Similarly, one input of each history select gate HSG[x] is connected to the output of the history bit latch HBL[x] of the same cell via an inverter I2[x], and the other input thereof is connected to the output of the location index gate LIG[x] of the same cell. Unlike the valid chain 22, the input of the location index gate LIG[7] of the history loop cell HLC[7] associated with the location at the top of the cache 10 is connected to the output of the history loop gate HLG[0] of the history loop cell HLC[0] associated with the location at the bottom of the cache 10, thus forming a true loop.

In operation, each time a location is selected for loading, say location [4], the location index latch LIL[4] in the history loop cell HLC[3] associated with the next lower history loop cell HLC[3] will be SET. (Note the staggered connections into the A port of the location index multiplexor 26 in FIG. 2.) Simultaneously, the location index latches LIL[7-4,2-0] in all other history loop cells HLC[7-4,2-0] will be CLEARed. Thus, only that history loop cell HLC[3] immediately below the history loop cell HLC[4] that was most recently selected for replacement will have its location index latch LIL[3] SET.

In the illustrated form, a given history loop cell, say HLC[3], will assert its history select signal HSS[3] only if (1) its history bit latch HBL[3] is CLEAR, indicating that the corresponding location in the cache 10 has not been accessed recently, and (2) the next higher history loop cell HLC[4] is asserting its history loop signal HLS[4], indicating that no history loop cell HLC[2-0,7-4] higher in the history loop 24 is asserting its history select signal HSS[2-0,7-4], respectively. (Remember that the history loop 24 is a full loop so that "higher" is relative backward around the full loop.) Simultaneously, that history loop cell HLC[3] will negate its history loop signal HLS[3] to prevent history loop cells HLC[2-0,7-4] below it from asserting their history select signals HSS[2-0,7-4], respectively. Thus, during any given cache cycle, only one history loop cell HLC[i] will assert its corresponding history select signal HSS[i].

Insofar as the FINUFO replacement mechanism is concerned, only those locations which contain valid address/data (i.e., "VALID" locations) are of "historical" interest. On the other hand, it is quite important that the "historical" information maintained on all such VALID locations be as current as possible. So long as the history bit latch HBL of at least one VALID location is CLEAR (i.e., a VALID but "UNUSED" location), then the history loop 24 is fully capable of determining which of all VALID locations was "least recently used" for FINUFO replacement purposes. However, if the history bit latches HBL of all VALID locations should become SET (i.e., all VALID locations become "USED"), any "new" history information will "overlay", and be effectively masked by, the "old" history information. To assure that the history loop 24 reflects as recent information as possible, the preferred embodiment includes logic to detect the "all used" case and simultaneously CLEAR all of the history bit latches HBL.

As shown in FIG. 4, each history loop cell HLC[x] includes a two input valid/history gate VHG[x] having one input connected to the output of the associated history bit latch HBL[x] and the other input connected to the output of the associated valid bit latch VBL[x] via an inverter I3[x]. The outputs of all of the valid/history gates VHG are in turn "wire-OR" connected to form a distributed NOR gate 34. Whenever the history bit latches HBL in all VALID locations are SET, NOR gate 34 will assert an ALLUSED signal to simultaneously CLEAR all of the history bit latches HBL, including those associated with INVALID locations, via an ALLCLEAR gate ACG[x] interposed between the history clear gate HCG[x] and the Clear input C of the history bit latch HBL[x] in each history loop cell HLC[x]. Thus, current history information will be continuously accumulated even when the valid chain 22 is preempting control.

Once the history loop 24 has "decided" on a particular selection, several events can occur which affect the state of any given history bit latch HBL[x], in turn changing the selection. For example, each time a VALID but UNUSED location is used, the associated history bit latch HBL[x] will be SET. However, whenever the address/data in a given location in the cache is invalidated, the associated valid bit latch VBL[x] and history bit latch HBL[x] will be simultaneously CLEARed. On the other hand, immediately after new address/data is loaded into a selected location, the associated valid bit latch VBL[x] and history bit latch HBL[x] will be simultaneously SET. Simultaneously, the history bit latch HBL[x] associated with all locations, if any, below the current index and the selected location will be CLEARed. Similarly, all history bit latches HBL will be simultaneously CLEARed in response to the SETting of the history bit latch HBL associated with the last VALID but UNUSED location.

Whether or not the change of a given history bit latch HBL[x] will affect the selection of the history loop 24 depends upon the position of the "changed" location in the loop 24 relative to the index and the current "selection". In general, only those locations below the index but above the current selection, inclusive, are relevant to the resolution of the history loop 24. For example, assume that the current index is [3], that is, that location [3] in the cache 10 is currently "first in line" for FINUFO replacement consideration. Assume also that location [1] is the current selection, implying that locations [3-2] are both VALID and USED while location [1] is UNUSED (even though it may be VALID). If location [1] is now simply accessed (rather than loaded), suggesting that it is indeed VALID, t promptly becomes USED. The history loop 24 must now scan further down the loop to find the next location which is UNUSED. On the other hand, suppose instead that location [2] is rendered INVALID/UNUSED, then the history loop 24 must move back up the loop to select location [2]. Similarly, if all VALID locations become USED, ALLUSED will promptly render all locations UNUSED, and the history loop 24 must back up to select location [3].

Since the history loop 24 must be able to "change its mind" as a result of certain independent events, it is essential that the state of no history bit latch HBL be changed as a result of any preselection which is NOT accepted for a load. Otherwise, the history loop 24 would not be able to reapply the FINUFO replacement criteria, since the information used to make the selection would already be altered. Accordingly, in the preferred embodiment, each history loop cell HLC[x] includes a history clear gate HCG[x] which has one input connected to the output of the history loop gate HLG[x] of the same history loop cell HLC[x], and another input connected to the LOAD signal. The output of the history clear gate HCG[x] is connected to the C input of the history bit latch HBL[x] of the same history loop cell HLC[x] via the ALLCLEAR gate ACG[x]. In general, the history bit latch HBL[x] of any particular history loop cell HLC[x] will be CLEARed only when a load is actually performed and the history loop signal HLS[x] for that cell is asserted. (Note that the history loop signal HLS[x] of a given history loop cell HLC[x] will be asserted ONLY if that cell is "between" the index and the selected location.) Thus, the states of the history bit latches HBL will not be affected by the continuing preselection activity of the history loop 24 until a preselected location is actually selected for a load.

In some applications, it may be desirable to "lock" address/data in one or more of the locations in the cache. To facilitate this function, each history loop cell HLC[x] may include a lock bit latch LBL[x] which is SET and CLEARed at the direction of the host. In this form, the output of the lock bit latch LBL[x] of each history loop cell HLC[x] is connected to a third input of that cell's history clear gate HCG[x] via an inverter I4[x]. Since a "locked" location may never be reused, this configuration prevents the history bit latch HBL[x] from being CLEARed during normal operation of the history loop 24. Reference may be made to U.S. patent application Ser. No. 812,566, entitled LOCK WARNING MECHANISM FOR A CACHE, for a more detailed discussion regarding the use of lock bits in a cache.

Although the present invention has been described in the context of a preferred embodiment thereof, various changes may be made to the arrangement or operation of the several elements to improve performance or enhance functionality in particular applications. For example, while the staggered connections into the A port of the location index multiplexor 26 (FIG. 2) may provide better performance in applications having multiple hosts, single host applications may find unstaggered connections more effective. These and other changes and modifications may be made without departing from the spirit and scope of the invention.

What we claim is:

1. In a cache having an ordered plurality of locations into a selected one of which information is loaded in response to a select signal applied thereto, a location selector comprising:
   an ordered plurality of valid bit latches, each associated with a respective one of the locations in the cache, for storing valid bits indicative of the validity of the information in the associated location in the cache;
   valid select logic, coupled to the valid bit latches, for determining the highest one, if any, of the valid bit latches having a valid bit indicating the invalidity of the information in the associated location in the cache, and providing a first location selection signal corresponding to that location in the cache;
   a location index latch, responsive to the select signal, for providing an index signal indicative of an indexed location in the cache relative to the location indicated by the select signal;

an ordered plurality of history bit latches, each associated with a respective one of the locations in the cache, for storing history bits indicative of the replacement status of the information in the associated location in the cache;

replacement select logic, coupled to the history bit latches, for determining the highest one, if any, of the history bit latches having a history bit indicating that the information in the associated location in the cache is replaceable, and providing a second location selection signal corresponding to that location in the cache; and location select logic, coupled to the valid bit latches, for applying the select signal to the location in the cache selected by the first location selection signal if at least one of the valid bits indicate that the information in the associated location in the cache is invalid, and applying the select signal to the location in the cache selected by the second location selection signal if all of the valid bits indicate that the information in the associated locations in the cache are valid;

characterized in that the location selector includes:
history bit control logic, coupled to the history bit latches and to the location index latch, for storing into each of the history bit latches associated with all locations in the cache lower than the indexed location but higher than the selected location, an indication that the information in the associated location in the cache is replaceable.

2. The location selector of claim 1 further characterized as including means for locking information in selected locations in the cache and for preventing the history bit control logic from storing into the history bit latches associated with said locations said indication that the information in said locations is replaceable.

3. The location selector of claim 1 further characterized as including means for storing into the history bit latch associated with each location in the cache which the associated valid bit latch indicates contains valid information, an indication that said information is replaceable, in response to detecting that the history bit latches associated with all such locations indicate that all such locations contain non-replaceable information.

4. In a cache having an ordered plurality of locations into a selected one of which information is loaded in response to a select signal applied thereto, a location selector comprising:

an ordered plurality of valid bit latches, each associated with a respective one of the locations in the cache, for storing valid bits indicative of the validity of the information in the associated location in the cache;

valid select logic, coupled to the valid bit latches, for determining the highest one, if any, of the valid bit latches having a valid bit indicating the invalidity of the information in the associated location in the cache, and providing a first location selection signal corresponding to that location in the cache;

a location index latch, responsive to the select signal, for providing an index signal indicative of an indexed location in the cache relative to the location indicated by the select signal;

an ordered plurality of history bit latches, each associated with a respective one of the locations in the cache, for storing history bits indicative of the replacement status of the information in the associated location in the cache;

replacement select logic, coupled to the history bit latches, for determining the highest one, if any, of the history bit latches having a history bit indicating that the information in the associated location in the cache is replaceable, and providing a second location selection signal corresponding to that location in the cache; and location select logic, coupled to the valid bit latches, for applying the select signal to the location in the cache selected by the first location selection signal if at least one of the valid bits indicate that the information in the associated location in the cache is invalid, and applying the select signal to the location in the cache selected by the second location selection signal if all of the valid bits indicate that the information in the associated locations in the cache are valid;

characterized in that the location selector stores into each of the history bit latches associated with all locations in the cache lower than the indexed location but higher than the selected location, an indication that the information in the associated location in the cache is replaceable.

5. The location selector of claim 4 further characterized as locking information in selected locations in the cache and preventing the storing into the history bit latches associated with said locations said indication that the information in said locations is replaceable.

6. The location selector of claim 4 further characterized as storing into the history bit latch associated with each location in the cache which the associated valid bit latch indicates contains valid information, an indication that said information is replaceable, in response to detecting that the history bit latches associated with all such locations indicate that all such locations contain nonreplaceable information.

7. In a cache location selector, a valid chain for selecting one location in a cache, if any, which does not contain valid information, comprising:

an ordered plurality of valid chain cells, each valid chain cell being associated with a respective one of the locations in the cache and comprising:

a valid bit latch for storing a valid bit indicative of the validity of the information in the associated location in the cache;

a valid chain gate having a first input coupled to the output of the valid bit latch of the same valid chain cell, a second input, and an output;

an inverter having an input coupled to the output of the valid chain latch of the same valid chain cell, and an output;

a valid select gate having a first input coupled to the output of the inverter of the same valid chain cell, a second input, and an output;

wherein the second inputs of the valid chain gate and of the valid select gate of the highest valid chain cell are connected so as to be asserted always, and wherein the second inputs of the valid chain gate and of the valid select gate of the valid chain cells other than the highest valid chain cell are coupled to the output of the valid chain gate of the next higher valid chain cell; whereby only one, if any, of the valid select gates will provide a valid select signal via the output thereof corresponding to said location in the cache, if any, which does not contain valid information.

8. The valid chain of claim 7 wherein the output of the valid chain gate of the lowest valid chain cell comprises an ALLVALID signal, which, when asserted, indicates that all of the locations in the cache contain valid information.

9. In a cache location selector, a history loop for selecting one location in a cache for First-In-Not-Used-First-Out (FINUFO) replacement, comprising:

an ordered plurality of history loop cells, each history loop cell being associated with a respective one of the locations in the cache and comprising:

a location index latch for storing an index bit indicative of information in the associated location in the cache being considered first for FINUFO replacement;

a location index gate having a first input coupled to the output of the location index latch of the same history loop cell, a second input, and an output;

a history bit latch for storing a history bit indicative of a recent access to the information in the associated location in the cache;

a history loop gate having a first input coupled to the output of the history bit latch of the same history loop cell, a second input coupled to the output of the location index gate of the same history loop cell, and an output;

a first inverter having an input coupled to the output of the history loop latch of the same history loop cell, and an output;

a history select gate having a first input coupled to the output of the first inverter of the same history loop cell, a second input coupled to the output of the location index gate of the same history loop cell, and an output;

wherein the second input of the location index gate of the highest history loop cell is coupled to the output of the history loop gate of the lowest history loop cell, and wherein the second input of the location index gate of every history loop cell other than the highest history loop cell is coupled to the output of the history loop gate of the next higher history loop cell; whereby only one of the history select gates will provide a history select signal via the output thereof corresponding to said location in the cache selected for FINUFO replacement.

10. The history loop of claim 9 wherein each history loop cell further comprises:

a history clear gate having a first input coupled to the output of the history loop gate of the same history loop cell, a second input adapted to receive a LOAD signal indicative of the loading of information into a location in the cache, and an output;

and wherein each history bit latch has a CLEAR input coupled to the output of the history loop gate of the same history loop cell.

11. The history loop of claim 10 wherein each history loop cell further comprises:

a lock bit latch for storing a lock bit indicative of information in the associated location in the cache being unavailable for FINUFO replacement; and a second inverter having an input coupled to the output of the lock bit latch of the same history loop cell, and an output;

and wherein each history clear gate has a third input coupled to the output of the second inverter of the same history loop cell.

12. The history loop of claim 10 wherein each history loop cell further comprises:

a valid history gate having a first input coupled to the output of the history bit latch of the same history loop cell, a second input adapted to receive a valid bit signal indicative of the invalidity of the information in the associated location in the cache, and an output;

and wherein each history bit latch has a CLEAR input coupled to the output of the history loop gate of the same history loop cell.

13. The cache location selector of claim 9 including a valid chain for selecting one location in a cache, if any, which does not contain valid information, comprising:

an ordered plurality of valid chain cells, each valid chain cell being associated with a respective one of the locations in the cache and comprising:

a valid bit latch for storing a valid bit indicative of the validity of the information in the associated location in the cache;

a valid chain gate having a first input coupled to the output of the valid bit latch of the same valid chain cell, a second input, and an output;

an inverter having an input coupled to the output of the valid chain latch of the same valid chain cell, and an output;

a valid select gate having a first input coupled to the output of the inverter of the same valid chain cell, a second input, and an output;

wherein the second inputs of the valid chain gate and of the valid select gate of the highest valid chain cell are connected so as to be asserted always, and wherein the second inputs of the valid chain gate and of the valid select gate of the valid chain cells other than the highest valid chain cell are coupled to the output of the valid chain gate of the next higher valid chain cell; whereby only one, if any, of the valid select gates will provide a valid select signal via the output thereof corresponding to said location in the cache, if any, which does not contain valid information.

14. The location selector of claim 13 wherein the output of the valid chain gate of the lowest valid chain cell comprises an ALLVALID signal, which, when asserted, indicates that all of the locations in the cache contain valid information, and wherein said valid select signal determines the selection of said selected one location in response to the negation of the ALLVALID signal, and the history select signal determines the selection of said selected one location in response to the assertion of the ALLVALID signal.

* * * * *